US008699515B2

(12) United States Patent
Townsley et al.

(10) Patent No.: US 8,699,515 B2
(45) Date of Patent: Apr. 15, 2014

(54) LIMITING OF NETWORK DEVICE RESOURCES RESPONSIVE TO IPV6 ORIGINATING ENTITY IDENTIFICATION

(75) Inventors: William Mark Townsley, Paris (FR); David Delano Ward, Somerset, WI (US); Timothy Patrick Donahue, Natick, MA (US)

(73) Assignee: Cisco Technology, Inc., San Jose, CA (US)

( * ) Notice: Subject to any disclaimer, the term of this patent is extended or adjusted under 35 U.S.C. 154(b) by 705 days.

(21) Appl. No.: 12/506,981

(22) Filed: Jul. 21, 2009

(65) Prior Publication Data

US 2011/0019677 A1 Jan. 27, 2011

(51) Int. Cl.
*H04J 3/16* (2006.01)
(52) U.S. Cl.
USPC ............ 370/466; 370/401; 709/245; 709/249
(58) Field of Classification Search
USPC .......... 370/389, 392, 401, 409, 466; 709/245, 709/249
See application file for complete search history.

(56) References Cited

U.S. PATENT DOCUMENTS

| 6,038,233 | A | * | 3/2000 | Hamamoto et al. .......... 370/401 |
| 6,434,627 | B1 | * | 8/2002 | Millet et al. .................. 709/245 |
| 6,580,717 | B1 | * | 6/2003 | Higuchi et al. ............... 370/401 |
| 6,650,641 | B1 | * | 11/2003 | Albert et al. .................. 370/392 |
| 7,072,981 | B1 | * | 7/2006 | O'Rourke et al. ............ 709/245 |
| 7,107,360 | B1 | * | 9/2006 | Phadnis et al. ............... 709/250 |
| 7,146,410 | B1 | * | 12/2006 | Akman ......................... 709/220 |
| 7,167,922 | B2 | * | 1/2007 | Narayanan .................... 709/242 |
| 7,188,191 | B1 | * | 3/2007 | Hovell et al. ................. 709/245 |
| 7,215,637 | B1 | * | 5/2007 | Ferguson et al. .......... 370/230.1 |
| 7,277,453 | B2 | * | 10/2007 | Chin et al. .................... 370/466 |
| 7,443,880 | B2 | * | 10/2008 | Wetterwald et al. .......... 370/466 |
| 7,586,940 | B1 | * | 9/2009 | Phadnis et al. ............... 370/466 |
| 7,644,151 | B2 | * | 1/2010 | Jerrim et al. ................. 709/224 |
| 7,734,745 | B2 | * | 6/2010 | Gloe ............................. 709/223 |
| 7,735,116 | B1 | * | 6/2010 | Gauvin ............................. 726/2 |
| 7,908,356 | B2 | * | 3/2011 | Ishiyama et al. ............. 709/224 |
| 8,045,558 | B2 | * | 10/2011 | Droms et al. ................. 370/392 |
| 8,108,553 | B2 | * | 1/2012 | Sollee .......................... 709/245 |
| 2004/0233916 | A1 | * | 11/2004 | Takeuchi et al. ......... 370/395.54 |
| 2005/0286553 | A1 | * | 12/2005 | Wetterwald et al. .......... 370/466 |
| 2006/0239202 | A1 | * | 10/2006 | Metzger et al. ............... 370/252 |
| 2007/0198735 | A1 | * | 8/2007 | Kim et al. ..................... 709/230 |
| 2008/0259925 | A1 | * | 10/2008 | Droms et al. ................. 370/392 |

OTHER PUBLICATIONS

Durand et al., "Dual-stack lite broadband deployments post IPv4 exhaustion," IETF document draft-durand-softwire-dual-stack-lite-01, The Internet Society, Nov. 2008 (32 pages).

Bagnulo et al., "IPv4/IPv6 Coexistence and Transition: Requirements for solutions," IETF document draft-ietf-v6ops-nat64-pb-statement-req-00, The Internet Society, May 13, 2008 (17 pages).

Davies et al., "IPv6 Transition/Coexistence Security Considerations," RFC 4942, The Internet Society, Sep. 2007 (41 pages).

* cited by examiner

*Primary Examiner* — Brian O'Connor
(74) *Attorney, Agent, or Firm* — The Law Office of Kirk D. Williams (57) ABSTRACT

Methods, apparatus, computer-storage media, mechanisms, and means associated therewith are used to limit network device resources based on the identification of the Internet Protocol version 6 (IPv6) originating entity (e.g., subscriber of a network carrier). As an IPv6 originating entity will typically be assigned $2^{64}$ or more valid IPv6 addresses, the originating entity may send packets with a source address of any of these valid IPv6 addresses and still be compliant with Internet standards and/or other specifications (e.g., RFCs). By determining the originating entity and controlling the allocation of network device resources based on the originating entity (in contrast to on a per valid IPv6 address basis), a network service provider can manage its network device resources, such as in a manner to prevent a depletion of resources caused by an originating entity using a plethora valid IPv6 addresses, or a malicious denial-of-service attack.

30 Claims, 3 Drawing Sheets

LIMITING OF NETWORK DEVICE RESOURCES RESPONSIVE TO IPV6 ORIGINATING ENTITY IDENTIFICATION

TECHNICAL FIELD

The present disclosure relates generally to communications and computer systems.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

The Internet is transitioning from using Internet Protocol version 4 (IPv4) to Internet Protocol version 6 (IPv6) packets and addressing. An original design goal of IPv6 was to create a network addressing scheme which would allow allocation of millions of individual IPv6 addresses to every network user. To accomplish this goal, addresses were given a size and structure which allows allocation of network prefixes to network users. The size of an allocated prefix may vary, but a single subscriber's home will be assigned a prefix which grants, at a minimum, $2^{64}$ unique IPv6 addresses to each home. During this transition phase, Internet carriers will be performing protocol translation between IPv4 and IPv6, to allow new and older systems to communicate.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with limiting of network device resources responsive to the identification of the Internet Protocol version 6 (IPv6) originating entity (e.g., subscriber of a network carrier). As an IPv6 originating entity will typically be assigned $2^{64}$ or more valid IPv6 addresses, the originating entity may send packets with a source address of any of these valid IPv6 addresses and still be compliant with Internet standards and/or other specifications (e.g., RFCs). By determining the originating entity and controlling the allocation of network device resources based on the originating entity (in contrast to on a per valid IPv6 address basis), a network service provider can manage its network device resources, such as in a manner to prevent a depletion of resources caused by an originating entity using a plethora of valid IPv6 addresses, or a malicious denial-of-service attack.

One embodiment includes an apparatus comprising one or more processing elements configured to perform operations, with said operations including: for each particular Internet Protocol version 6 (IPv6) packet of a received plurality of IPv6 packets: determining a particular originating entity of a plurality of originating entities for said particular IPv6 packet based on the IPv6 source address of said particular IPv6 packet, wherein the particular originating entity corresponds to a limited group of network device resources of a plurality of limited groups of network device resources; and processing said particular IPv6 packet using the limited group of network device resources; wherein the IPv6 source address of each of the received plurality of IPv6 packets is a valid IPv6 address; and wherein said operations of determining the particular originating entity for a plurality of said received plurality of IPv6 packets include determining the same particular originating entity for at least two different IPv6 source addresses of said received plurality of IPv6 packets. In one embodiment, these network device resources include storage and/or processing, such as that used for performing Network Address Translation (NAT), network tunnels, and/or other networking functionality. In one embodiment, these network device resources include resources related to, but are not limited to, Session Border Control (SBC), firewalls, deep packet inspection engine, gateway General Packet Radio Service (GPRS) support node (GGSN gateway).

2. Description

Disclosed are, inter alia, methods, apparatus, computer-storage media, mechanisms, and means associated with limiting of network device resources responsive to the identification of the Internet Protocol version 6 (IPv6) originating entity (e.g., subscriber of a network carrier).

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although any embodiment may include some, all or none of the features, elements and/or limitations described in relation to a particular different one embodiment. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Note, nothing described or referenced in this document is admitted as prior art to this application unless explicitly so stated.

Disclosed are, inter alia, methods, apparatus, computer-storage media, mechanisms, and means associated with limiting of network device resources responsive to the identification of the Internet Protocol version 6 (IPv6) originating entity (e.g., subscriber of a network carrier). As an IPv6 originating entity will typically be assigned $2^{64}$ or more valid IPv6 addresses, the originating entity may send packets with a source address of any of these valid IPv6 addresses and still be compliant with Internet standards and/or other specifications (e.g., RFCs). By determining the originating entity and controlling the allocation of network device resources based on the originating entity (in contrast to on a per valid IPv6 address basis), a network service provider can manage its network device resources, such as in a manner to prevent a depletion of resources caused by an originating entity using a plethora valid IPv6 addresses, or a malicious denial-of-service attack. In one embodiment, these network device resources include storage and/or processing, such as that used for performing Network Address Translation (NAT), network tunnels, and/or other networking functionality. Note, when an embodiment is described herein in the context of NAT, typically the description focuses on the IPv6 to IPv4 address translation. It is understood that NAT functionality is typically provided, although not required to be so, in both directions by a standalone NAT apparatus or by the NAT functionality provided in another network device (e.g., router).

With IPv4 address completion imminent, carriers are implementing public IPv4 conservation and recovery practices and simultaneously planning evolution to IPv6. During network evolution to IPv6 a combination of public IPv4 addressing, private IPv4 addressing, and public IPv6 addressing and transport will be used.

In one model of network evolution, a carrier uses IPv6-based transport and provisioning. Public IPv6 address prefixes are assigned to subscribers, including via DHCPv6. Subscriber IPv6-capable devices may then communicate with the IPv6 Internet directly. Subscriber devices capable of IPv4 only are assigned private IPv4 addresses. Packets from these devices are encapsulated (or tunneled) in IPv6 packets and forwarded toward the public IPv4 Internet. Before exiting the carrier's network, the tunneled IPv4 packets pass through a NAT function, which terminates the IPv6 tunnels and translates private IPv4 addresses to public IPv4 addresses. Packets with public IPv4 addresses are then routed to the destination in the public IPv4 Internet.

In a second model of network evolution, a carrier operates an all-IPv6 network. In this network, the carrier assigns IPv6 address prefixes to subscribers. Communication between IPv6-only subscriber devices and the legacy public IPv4 Internet is supported by first routing traffic through a NAT function, which translates IPv6 packets sent by a subscriber to IPv4 packets and forwards the packets to the public IPv4 Internet. Similarly, packets returning to the carrier's IPv6 network from the public IPv4 Internet are translated back to IPv6 and forwarded toward the originating subscriber by the NAT function.

In both cases, and in other NAT scenarios involving IPv4 and IPv6, the carrier NAT function sets up a mapping between a subscriber's assigned IPv6 address or prefix, the private IPv4 address, and a public IPv4 address used to connect to the public IPv4 Internet.

The NAT function references such a mapping in forwarding every packet between a subscriber and the public IPv4 Internet. Control plane processing capacity and persistent storage are required in the NAT function to establish and maintain these mappings. In the NAT function, both control plane processing capacity and persistent storage are finite resources.

An original design goal of IPv6 was to create a network addressing scheme which would allow allocation of millions of individual IPv6 addresses to every network user. To accomplish this goal, addresses were given a size and structure which allows allocation of network prefixes to network users. The size of an allocated prefix may vary, but a single subscriber's home will typically be assigned a prefix which grants, at a minimum, $2^{64}$ unique IPv6 addresses to each home. This is a stark contrast to IPv4, where each home is assigned a single IPv4 address.

A subscriber, improperly configured, or improperly operating equipment that uses many different, albeit valid, IPv6 addresses could cause a depletion of network device resources, such as for, but not limited to, performing network address translation during the transitioning of IPv4 to IPv6 networks, when every valid IPv6 source address is allocated different network device resources. Furthermore, a malicious network user could exploit this allocation of network device resources on a per IPv6 source address basis as part of a denial of service, or other attack on the network.

For example, assume each subscriber (e.g., originating entity) has been allocated an IPv6 network prefix, which identifies a very large block of IPv6 addresses. Consistent with the IPv6 protocol, the subscriber may use any address in that block as a valid source address. The subscriber may send IPv6 packets to the public IPv4 Internet using many different, but valid, IPv6 source addresses. If the NAT function establishes translations for each unique IP address, the NAT resources of the router may be consumed by a single user, such as by, but not limited to, overloading the NAT translation setup function and depleting the storage used to maintain these translations. This may deny other subscribers, attached to the same NAT device, access to the public IPv4 Internet. Besides the stated benefit to network security, maintaining per-subscriber/originating entity address prefix information on the NAT provides the operator with another way to monitor the behavior and performance of the network, and characterize the applications in use. Furthermore, pre-provisioning of translation database potentially improves NAT performance.

Protection against potential resource depletion denial-of-service attacks in carrier NAT environments using IPv6 may be provided in several ways. For example, in one embodiment, the NAT function allows configuration of a range of IPv6 addresses (e.g., v6 prefix and length) per subscriber. Upon receipt of the first tunneled IPv4 or native IPv6 packet from a subscriber, the NAT checks the IPv6 source address against the configured range. If this source address falls within the range, the NAT will establish a translation for that subscriber, translate the packet, and forward it to the public IPv4 Internet.

One embodiment assigns IPv6 addresses, so the subscriber (e.g., originating entity) can be calculated based on any of its valid IPv6 addresses. By assigning prefixes to subscribers in a consistent and well-ordered manner, a starting IPv6 prefix for the subscriber address pool along with a prefix size for all subscribers in that pool can be easily calculated. Multiple pools may be configured, for example, one for residential subscribers assigned a 56-bit prefix, and another for /48 enterprise subscribers assigned a 48-bit (/48) prefix, etc.

When an IPv6 packet arrives which is destined for the network address translation (e.g., DS-Lite or NAT64) function and which has a source address which does not match an existing subscriber mapping, the packet's source address is examined and placed within a table of prefixes having a common length (/56, /48, etc.) according to the configured pool ranges. From this point, it is as if the subscriber had the prefix explicitly configured. Subsequent packets with source addresses falling within the range of source addresses associated with the subscriber will be subject to one or more lookups in order to determine the mapping (and associated policy in terms of resource usage, etc.) for each subscriber.

In different embodiments, the rules for validating the source address may vary. For example, in a "loose" validation, as long as the packet's source address falls within the range of addresses allocated for a subscriber, a new translation (DS-lite decap and NAT44 or NAT64) for the subscriber will be established and the packet translated and forwarded. Each subscriber (e.g., the originating entity identified based on the IPv6 valid address range) would be subject to a maximum translation limit, preventing any one subscriber from consuming all of the available translation resources. In DS-lite, this mode has the potential processing advantage of requiring only the first /56, /48, etc. bits to be matched in order to identify the subscriber mapping to use, potentially improving the performance of translation creation. For example in a "strict" validation, the router will drop any packet having a source address which falls within the range of addresses allocated for a subscriber, but which does not match the source of packets previously received from that subscriber. For DS-lite, this means that one and only one IPv6 /128 source address will be allowed for a given subscriber tunnel (unless multiple tunnels are explicitly allowed for service separation). With either type of lookup, a packet having an IPv6 source address for which a translation has been established (by configuration, or dynamically) will be translated, or decapsulated and translated in the DS-Lite case, then forwarded to the public IPv4 Internet.

In one embodiment, the NAT function is placed between the subscribers (e.g., originating entities) and the DHCPv6 server. The NAT function then 'snoops' prefix assignment requests sent by subscribers and/or prefix assignments returned by the DHCPv6 device. The captured IPv6 prefix assignment information is used to populate a verification database. The information could also be used to establish per-subscriber translations on the NAT function, saving processing overhead when the subscriber begins transmitting packets to a destination in the public IPv4 Internet. Of course, the checks applied by the NAT to the IPv6 source address in a packet received from a subscriber could be the same as those described above, namely, "loose" and "strict".

In one embodiment, per-subscriber policy information distributed from a RADIUS server to a broadband network gateway (BNG) is shared with the NAT function, either directly from the RADIUS server, via snooping, or by way of the BNG. Information required to provision the subscriber session, rather than just the subscriber's network address, could be pruned before transmission to the function, leaving the NAT function unaware of the details of network subscribers.

Disclosed are, inter alia, methods, apparatus, computer-storage media, mechanisms, and means associated with limiting of network device resources responsive to the identification of the Internet Protocol version 6 (IPv6) originating entity (e.g., subscriber of a network carrier). As an IPv6 originating entity will typically be assigned $2^{64}$ or more valid IPv6 addresses, the originating entity may send packets with a source address of any of these valid IPv6 addresses and still be compliant with Internet standards and/or other specifications (e.g., RFCs). By determining the originating entity and controlling the allocation of network device resources based on the originating entity (in contrast to on a per valid IPv6 address basis), a network service provider can manage its network device resources, such as in a manner to prevent a depletion of resources caused by an originating entity using a plethora of valid IPv6 addresses, or a malicious denial-of-service attack. In one embodiment, these network device resources include storage and/or processing, such as that used for performing Network Address Translation (NAT), network tunnels, and/or other networking functionality. In one embodiment, these network device resources include resources related to, but are not limited to, Session Border Control (SBC), firewalls, deep packet inspection engine, gateway General Packet Radio Service (GPRS) support node (GGSN gateway).

One embodiment includes an apparatus comprising one or more processing elements configured to perform operations, with said operations including: for each particular Internet Protocol version 6 (IPv6) packet of a received plurality of IPv6 packets: determining a particular originating entity of a plurality of originating entities for said particular IPv6 packet based on the IPv6 source address of said particular IPv6 packet, wherein the particular originating entity corresponds to a limited group of network device resources of a plurality of limited groups of network device resources; and processing said particular IPv6 packet using the limited group of network device resources; wherein the IPv6 source address of each of the received plurality of IPv6 packets is a valid IPv6 address; and wherein said operations of determining the particular originating entity for a plurality of said received plurality of IPv6 packets include determining the same particular originating entity for at least two different IPv6 source addresses of said received plurality of IPv6 packets.

In one embodiment, each limited group of network device resources of the plurality of limited groups of network device resources corresponds to a different originating entity of the plurality of originating entities. In one embodiment, the apparatus is configured to be communicatively coupled to each said determined particular originating entity through one or more other router apparatus; and wherein said operation of determining the particular originating entity is performed without using Layer-2 connectivity information for said determined particular originating entities. In one embodiment, said operation of determining the particular originating entity is said determined solely based on the IPv6 source address of said particular IPv6 packet. In one embodiment, the limited group of network device resources includes resources for performing network address translation (NAT) of said particular IPv6 packet into an Internet Protocol version 4 (IPv4) packet. In one embodiment, the limited group of network device resources corresponding to the particular originating entity is a limited amount less than all of the resources available for performing NAT of the plurality of packets. In one embodiment, the particular originating entity is identified by a prefix, and not a fully expanded address, of the IPv6 source address of said particular IPv6 packet.

In one embodiment, said operation of determining the particular originating entity for said particular IPv6 packet based on the IPv6 source address of said particular IPv6 packet includes comparing the IPv6 source address of said particular IPv6 packet with a plurality of ranges of IPv6 addresses with the matching range corresponding to the particular originating entity. In one embodiment, said operations include: maintaining, for each of the plurality of originating entities, an identification of one or more ranges of the plurality of ranges of IPv6 addresses. In one embodiment, the limited group of network device resources includes resources for performing network address translation (NAT) of said particular IPv6 packet into an Internet Protocol version 4 (IPv4) packet; wherein the limited group of network device resources corresponding to the particular originating entity is a limited amount less than all of the resources available for performing NAT of the plurality of packets; and wherein the apparatus is communicatively coupled to each said determined particular originating entity through one or more other router apparatus; and wherein said operation of determining the particular originating entity is performed without using Layer-2 connectivity information for said determined particular originating entities. One embodiment includes: means for snooping ranges of the plurality of ranges of IPv6 addresses from packets, including IPv6 address assignment information, passing through the apparatus. In one embodiment, the plurality of ranges of IPv6 addresses include a plurality of sets of different prefix lengths such that a range within each particular set of the plurality of sets of different prefix lengths can be identified based the prefix length corresponding to the particular set. In one embodiment, wherein the limited group of network device resources includes resources for performing network address translation (NAT) of said particular IPv6 packet into an Internet Protocol version 4 (IPv4) packet; wherein the limited group of network device resources corresponding to the particular originating entity is a limited amount less than all of the resources available for performing NAT of the plurality of packets; and wherein the apparatus is communicatively coupled to each said determined particular originating entity through one or more other router apparatus; and wherein said operation of determining the particular originating entity is performed without using Layer-2 connectivity information for said determined particular originating entities. In one embodiment, the limited group of network device resources includes resources for performing network address translation (NAT) of said particular IPv6 packet into an Internet Protocol version 4 (IPv4) packet. In one embodiment, said operation of processing said particular IPv6 packet using the limited group corresponding to the particular originating entity includes dropping packets of all but one valid IPv6 address corresponding to the particular originating entity. In one embodiment, the apparatus is communicatively coupled to each said determined particular originating entity through one or more other router apparatus; and wherein said operation of determining the particular originating entity is performed without using Layer-2 connectivity information for said determined particular originating entities. In one embodiment, the limited group of network device resources includes resources for performing network address translation (NAT) of said particular IPv6 packet into an IPv4 packet; wherein the limited group of network device resources corresponding to the particular originating entity is a limited amount less than all of the resources available for performing NAT of the plurality of packets; and wherein the apparatus is communicatively coupled to each said determined particular originating entity through one or more other router apparatus; and wherein said operation of determining the particular originating entity is performed without using Layer-2 connectivity information for said determined particular originating entities. In one embodiment, each limited group of network device resources of the plurality of limited groups of network device resources corresponds to a different originating entity of the plurality of originating entities. In one embodiment, the plurality of limited groups of network device resources includes resources for performing network address translation (NAT) of said particular IPv6 packet into an Internet Protocol version 4 (IPv4) packet.

One embodiment includes a method performed by a particular networking apparatus, with the method comprising: for each particular Internet Protocol version 6 (IPv6) packet of a received plurality of IPv6 packets: determining a particular originating entity of a plurality of originating entities for said particular IPv6 packet based on the IPv6 source address of said particular IPv6 packet, wherein the particular originating entity corresponds to a limited group of network device resources of a plurality of limited groups of network device resources; and processing said particular IPv6 packet using the limited group of network device resources; wherein the IPv6 source address of each of the received plurality of IPv6 packets is a valid IPv6 address; and wherein said operations of determining the particular originating entity for a plurality of said received plurality of IPv6 packets include determining the same particular originating entity for at least two different IPv6 source addresses of said received plurality of IPv6 packets.

In one embodiment, the particular networking apparatus is communicatively coupled to each said determined particular originating entity through one or more other router apparatus; and wherein said operation of determining the particular originating entity is performed without using Layer-2 connectivity information for said determined particular originating entities. In one embodiment, the limited group of network device resources includes resources for performing network address translation (NAT) of said particular IPv6 packet into an Internet Protocol version 4 (IPv4) packet. In one embodiment, the particular originating entity is identified by a prefix, and not a fully expanded address, of the IPv6 source address of said particular IPv6 packet.

One embodiment includes an apparatus, comprising: means for determining, for each particular Internet Protocol version 6 (IPv6) packet of a received plurality of IPv6 packets, a particular originating entity of a plurality of originating entities for said particular IPv6 packet based on the IPv6 source address of said particular IPv6 packet, wherein the particular originating entity corresponds to a limited group of network device resources of a plurality of limited groups of network device resources; and means for processing said each particular IPv6 packet using said corresponding limited group of network device resources; wherein the IPv6 source address of each of the received plurality of IPv6 packets is a valid IPv6 address; wherein said operations of determining the particular originating entity for a plurality of said received plurality of IPv6 packets include determining the same particular originating entity for at least two different IPv6 source addresses of said received plurality of IPv6 packets; wherein the apparatus is communicatively coupled to each said determined particular originating entity through one or more other router apparatus; and wherein said means for determining the particular originating entity is performed without using Layer-2 connectivity information for said determined particular originating entities.

In one embodiment, the limited group of network device resources includes resources for performing network address translation (NAT) of said particular IPv6 packet into an Internet Protocol version 4 (IPv4) packet; wherein the limited group of network device resources corresponding to the particular originating entity is a limited amount less than all of the resources available for performing NAT of the plurality of packets. In one embodiment, the particular originating entity is identified by a prefix, and not a fully expanded address, of the IPv6 source address of said particular IPv6 packet.

Figure 1:
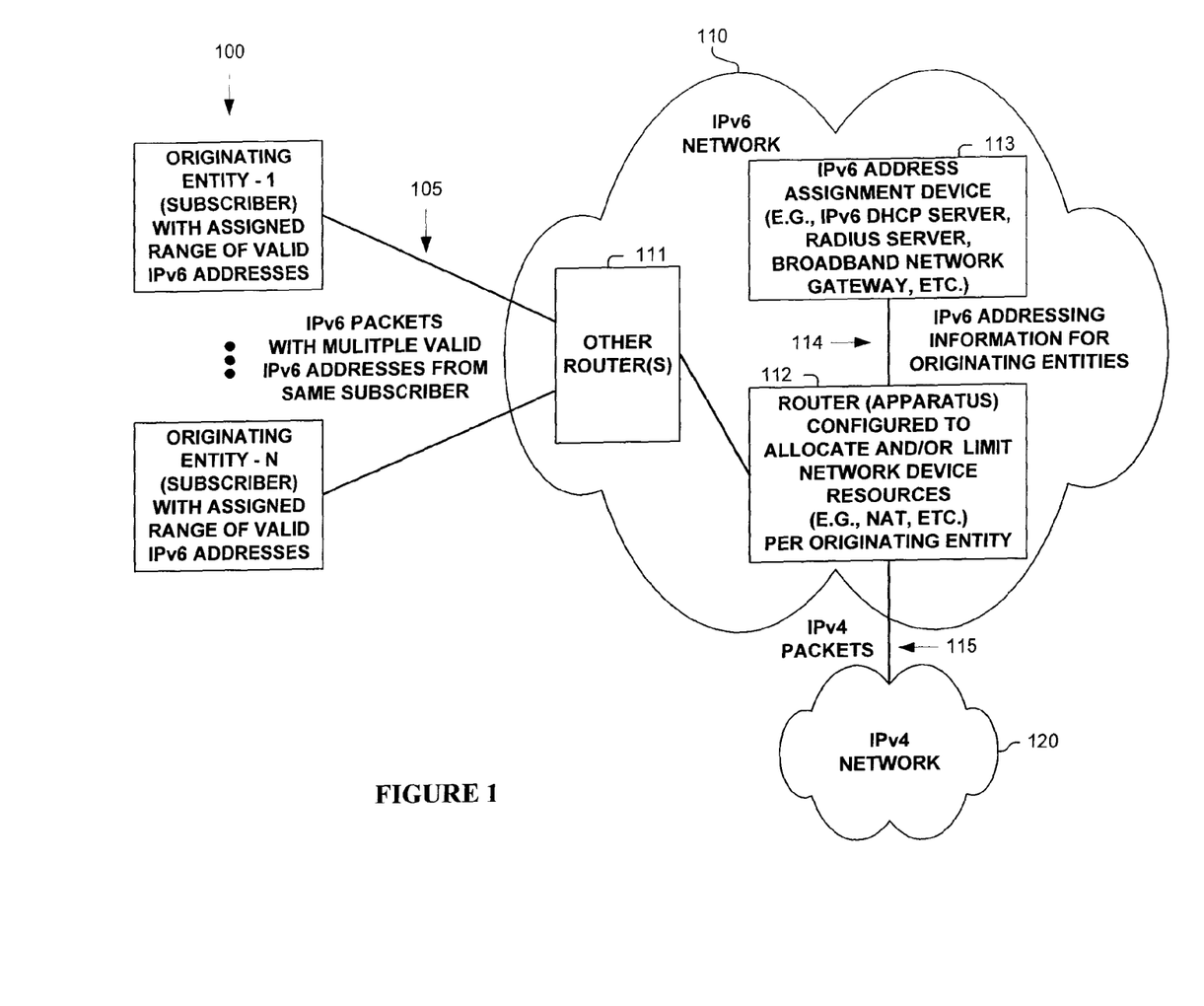
FIG. 1 illustrates an example network operating according to one embodiment.

Expressly turning to the figures, FIG. 1 illustrates an example network, including IPv6 network 110 and IPv4 network 120, operating according to one embodiment. As shown, IPv6 network 110 includes an router/apparatus 112 configured to allocate and/or limit, on a per originating entity basis, network device resources (e.g., storage and/or processing, such as that used for performing NAT, network tunnels, and/or other networking functionality).

Additionally, IPv6 network 110 includes other router(s) located between apparatus 112 and originating entities 1-N (100), in order to illustrate that in one embodiment, apparatus 112 cannot use Layer-2 (L2) information in determining the originating entity corresponding to the packet, as router 112 will not receive such L2 information being behind another router 111. Additionally, IPv6 network includes IPv6 address assignment device 113 (e.g., IPv6 DHCP server, Radius server, Broadband Network Gateway, etc.), such that router 112 can snoop, receive, or otherwise acquire IPv6 originating entity address information 114.

In the operation of one embodiment, originating entities 1-N (100) each are assigned a range of valid IPv6 addresses to use in sending IPv6 packets 105, which may be communicated to router 112 via other router(s) 111. Router 112 determines the originating entity (100) based on, and possibly solely on, the IPv6 source address of the received IPv6 packet. Router 112 then uses the identification of the originating entity to initially allocate and/or limit the use of network device resources, as well as in processing packets (e.g., by processing according to the resources previously assigned to the identified originating entity). In this manner, an originating entity sending IPv6 packets with different IPv6 addresses, albeit valid IPv6 addresses, will not over consume and/or deplete the network device resources which would typically occur if a router assigns network device resources on a per IP address basis. In one embodiment, these network device resources include storage (e.g., for storing state information) and/or processing resources for performing NAT translation of IPv6 packets (105) and IPv4 packets (115). In one embodiment, the originating entity is identified by a prefix, and not a fully expanded address, of the IPv6 source address of the received IPv6 packet. Furthermore, in one embodiment, a device external to router 112, such as a network translation device, performs the identification of the originating entity and/or uses the identification of the originating entity to initially allocate and/or limit the use of network device resources.

Figure 2:
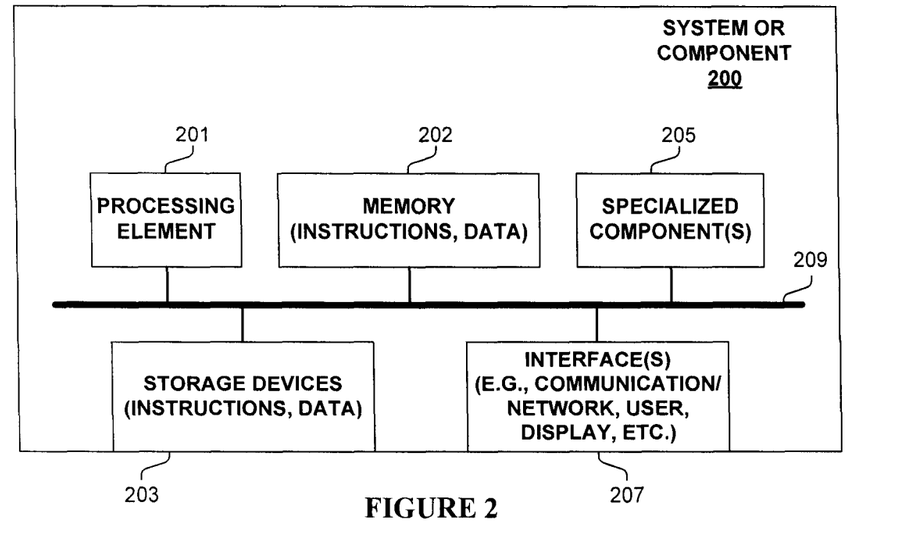
FIG. 2 illustrates an example system or component used in one embodiment.

FIG. 2 is block diagram of a system or component 200 of a router used in one embodiment that limits the allocation and use of network device resources responsive to the identification of the IPv6 originating entity of an IPv6 packet. In one embodiment, system or component 200 performs one or more processes corresponding to one of the flow diagrams illustrated or otherwise described herein.

In one embodiment, system or component 200 includes a processing element 201, memory 202, storage devices 203, specialized components 205 (e.g. optimized hardware such as for performing classification operations for identifying the originating entity based on an IPv6 source address, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application.

Various embodiments of component 200 may include more or less elements. The operation of component 200 is typically controlled by processing element 201 using memory 202 and storage devices 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

Figure 3:
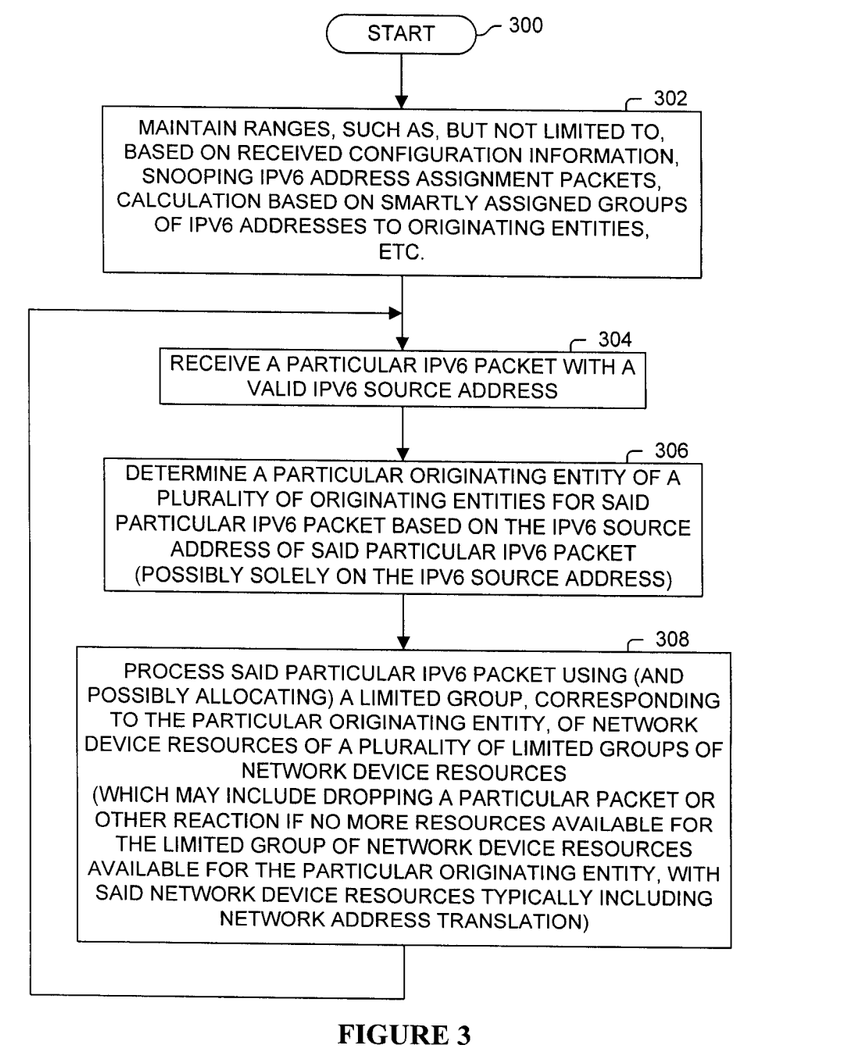
FIG. 3 illustrates a process performed in one embodiment.

FIG. 3 illustrates a process (or parts of multiple processes) performed in one embodiment, such as by a router, another network device and/or the combination of multiple devices. Processing begins with process block 300. In process block 302, the ranges of the IPv6 addresses for originating entities are maintained. Different embodiments may maintain this information in a variety of ways, which may include storing information for calculating the originating entity from the IPv6 source address (possibly according to multiple pools of lengths of originating entity assigned IPv6 addresses), or storing complete IPv6 address information for each originating entity. This information may be programmed into the router, manually configured into the router, snooped by the router, and/or received or acquired in some other manner (e.g., from a Radius Server or Broadband Network Server). Of course, the term "maintaining" typically includes updating this information appropriately.

The flow diagram of FIG. 3 illustrates in process blocks 304, the processing of received IPv6 packets using, and possibly allocating, network device resources (e.g., storage and/or processing, such as that used for performing Network Address Translation (NAT), network tunnels, and/or other networking functionality). In process block 304, an IPv6 packet is received with a valid IPv6 source address. In process block 306, the particular originating entity of a plurality of originating entities for said particular IPv6 packet is determined based on, and possibly solely on, the IPv6 source address of said particular IPv6 packet. In one embodiment, the particular originating entity is identified by a prefix, and not a fully expanded address, of the IPv6 source address of the received IPv6 packet. In process block 308, said particular IPv6 packet is processed using, possibly after allocating, a limited group, corresponding to the particular originating entity, of network device resources of a plurality of limited groups of network device resources. For example, this processing may include performing network address translation of the IPv6 packet to an IPv4 packet. Furthermore, this processing may include dropping a particular packet or other reaction if no more resources available for the limited group of network device resources available for the particular originating entity, with said network device resources typically including network address translation. Processing returns to process block 304 to receive more packets.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus comprising one or more processing elements configured to perform operations, with said operations including:
   for each particular Internet Protocol version 6 (IPv6) packet of a received plurality of IPv6 packets:
      determining a particular originating entity of a plurality of originating entities for said particular IPv6 packet based on the IPv6 source address of said particular IPv6 packet, wherein the particular originating entity corresponds to a limited group of network device resources of a plurality of limited groups of network device resources of the apparatus; and
      processing said particular IPv6 packet using the limited group of network device resources;
   wherein the IPv6 source address of each of the received plurality of IPv6 packets is a valid IPv6 address;
   wherein said operations of determining the particular originating entity for a plurality of said received plurality of IPv6 packets include determining the same particular originating entity for at least two different IPv6 source addresses of said received plurality of IPv6 packets; and
   wherein the apparatus is a network appliance.

2. The apparatus of claim 1, wherein the apparatus is configured to be communicatively coupled to each said determined particular originating entity through one or more router apparatus; and wherein said operation of determining the particular originating entity is performed without using Layer-2 connectivity information for said determined particular originating entities.

3. The apparatus of claim 2, wherein said operation of determining the particular originating entity is said determined solely based on the IPv6 source address of said particular IPv6 packet.

4. The apparatus of claim 1, wherein the limited group of network device resources includes resources for performing network address translation (NAT) of said particular IPv6 packet into an Internet Protocol version 4 (IPv4) packet.

5. The apparatus of claim 4, wherein the limited group of network device resources corresponding to the particular originating entity is a limited amount less than all of the resources available for performing NAT of the plurality of packets.

6. The apparatus of claim 1, wherein said operation of determining the particular originating entity for said particular IPv6 packet based on the IPv6 source address of said particular IPv6 packet includes comparing the IPv6 source address of said particular IPv6 packet with a plurality of ranges of IPv6 addresses with the matching range corresponding to the particular originating entity.

7. The apparatus of claim 6, wherein said operations include: maintaining, for each of the plurality of originating entities, an identification of one or more ranges of the plurality of ranges of IPv6 addresses.

8. The apparatus of claim 7, wherein the limited group of network device resources includes resources for performing network address translation (NAT) of said particular IPv6 packet into an Internet Protocol version 4 (IPv4) packet; wherein the limited group of network device resources corresponding to the particular originating entity is a limited amount less than all of the resources available for performing NAT of the plurality of packets; and wherein the apparatus is communicatively coupled to each said determined particular originating entity through one or more router apparatus; and wherein said operation of determining the particular originating entity is performed without using Layer-2 connectivity information for said determined particular originating entities.

9. The apparatus of claim 7, wherein the apparatus is configured to snoop ranges of the plurality of ranges of IPv6 addresses from packets, including IPv6 address assignment information, passing through the apparatus.

10. The apparatus of claim 6, wherein the plurality of ranges of IPv6 addresses include a plurality of sets of different prefix lengths such that a range within each particular set of the plurality of sets of different prefix lengths can be identified based the prefix length corresponding to the particular set.

11. The apparatus of claim 10, wherein the limited group of network device resources includes resources for performing network address translation (NAT) of said particular IPv6 packet into an Internet Protocol version 4 (IPv4) packet; wherein the limited group of network device resources corresponding to the particular originating entity is a limited amount less than all of the resources available for performing NAT of the plurality of packets; and wherein the apparatus is communicatively coupled to each said determined particular originating entity through one or more router apparatus; and wherein said operation of determining the particular originating entity is performed without using Layer-2 connectivity information for said determined particular originating entities.

12. The apparatus of claim 6, wherein the limited group of network device resources includes resources for performing network address translation (NAT) of said particular IPv6 packet into an Internet Protocol version 4 (IPv4) packet.

13. The apparatus of claim 12, wherein said operation of processing said particular IPv6 packet using the limited group corresponding to the particular originating entity includes dropping packets of all but one valid IPv6 address corresponding to the particular originating entity.

14. The apparatus of claim 13, wherein the apparatus is communicatively coupled to each said determined particular originating entity through one or more router apparatus; and wherein said operation of determining the particular originating entity is performed without using Layer-2 connectivity information for said determined particular originating entities.

15. The apparatus of claim 14, wherein the limited group of network device resources includes resources for performing network address translation (NAT) of said particular IPv6 packet into an IPv4 packet; wherein the limited group of network device resources corresponding to the particular originating entity is a limited amount less than all of the resources available for performing NAT of the plurality of packets; and wherein the apparatus is communicatively coupled to each said determined particular originating entity through one or more router apparatus; and wherein said operation of determining the particular originating entity is performed without using Layer-2 connectivity information for said determined particular originating entities.

16. The apparatus of claim 1, wherein the particular originating entity is identified by a prefix, and not a fully expanded address, of the IPv6 source address of said particular IPv6 packet.

17. The apparatus of claim 16, wherein each limited group of network device resources of the plurality of limited groups of network device resources corresponds to a different originating entity of the plurality of originating entities.

18. The apparatus of claim 17, wherein the plurality of limited groups of network device resources includes resources for performing network address translation (NAT) of said particular IPv6 packet into an Internet Protocol version 4 (IPv4) packet.

19. The apparatus of claim 1, wherein each limited group of network device resources of the plurality of limited groups of network device resources corresponds to a different originating entity of the plurality of originating entities.

20. The apparatus of claim 1, wherein the network appliance is a router.

21. The apparatus of claim 1, wherein each of the plurality of originating entities is a different subscriber of a network carrier; and wherein the particular originating entity is a particular subscriber of the network carrier.

22. The apparatus of claim 1, wherein each of the plurality of limited groups of network device resources is a storage limitation for a corresponding originating entity of the plurality of originating entities.

23. The apparatus of claim 1, wherein each of the plurality of limited groups of network device resources is a network address translation (NAT) processing limitation for a corresponding originating entity of the plurality of originating entities.

24. A method performed by a particular network appliance, the method comprising:
for each particular Internet Protocol version 6 (IPv6) packet of a received plurality of IPv6 packets:
determining a particular originating entity of a plurality of originating entities for said particular IPv6 packet based on the IPv6 source address of said particular IPv6 packet, wherein the particular originating entity corresponds to a limited group of network device resources of a plurality of limited groups of network device resources of the particular network appliance; and
processing said particular IPv6 packet using the limited group of network device resources;
wherein the IPv6 source address of each of the received plurality of IPv6 packets is a valid IPv6 address; and
wherein said operations of determining the particular originating entity for a plurality of said received plurality of IPv6 packets include determining the same particular originating entity for at least two different IPv6 source addresses of said received plurality of IPv6 packets.

25. The method of claim 24, wherein the particular network appliance is communicatively coupled to each said determined particular originating entity through one or more routers; and wherein said operation of determining the particular originating entity is performed without using Layer-2 connectivity information for said determined particular originating entities.

26. The method of claim 25, wherein the limited group of network device resources includes resources for performing network address translation (NAT) of said particular IPv6 packet into an Internet Protocol version 4 (IPv4) packet.

27. The method of claim 24, wherein the particular originating entity is identified by a prefix, and not a fully expanded address, of the IPv6 source address of said particular IPv6 packet.

28. The method of claim 24, wherein each of the plurality of originating entities is a different subscriber of a network carrier; and wherein the particular originating entity is a particular subscriber of the network carrier.

29. The method of claim 24, wherein each of the plurality of limited groups of network device resources is a storage limitation for a corresponding originating entity of the plurality of originating entities.

30. The method of claim 24, wherein each of the plurality of limited groups of network device resources is a network address translation (NAT) processing limitation for a corresponding originating entity of the plurality of originating entities.

* * * * *